(12) United States Patent
Mallela et al.

(10) Patent No.: US 10,394,734 B1
(45) Date of Patent: Aug. 27, 2019

(54) DRIVER FOR NETWORK TIMING SYSTEM

(71) Applicant: ALTERA CORPORATION, San Jose, CA (US)

(72) Inventors: Sita Rama Chandrasekhar Mallela, Tanjung Bungah (MY); Yu Ying Choo, Klang (MY)

(73) Assignee: Altera Corporation, San Jose, CA (US)

( * ) Notice: Subject to any disclaimer, the term of this patent is extended or adjusted under 35 U.S.C. 154(b) by 442 days.

(21) Appl. No.: 15/201,006

(22) Filed: Jul. 1, 2016

Related U.S. Application Data

(60) Provisional application No. 62/331,910, filed on May 4, 2016.

(51) Int. Cl.
| G06F 13/00 | (2006.01) |
| G06F 13/32 | (2006.01) |
| G06F 13/22 | (2006.01) |

(52) U.S. Cl.
CPC ............. *G06F 13/32* (2013.01); *G06F 13/22* (2013.01)

(58) Field of Classification Search
CPC .................................. G06F 13/32; G06F 13/22
See application file for complete search history.

(56) References Cited

U.S. PATENT DOCUMENTS

| 9,001,951 B1 | 4/2015 | Kumpulainen | |
| 2005/0190797 A1* | 9/2005 | Elliot | H04J 3/0697 370/503 |
| 2017/0005902 A1* | 1/2017 | Mirsky | H04L 69/28 |

* cited by examiner

*Primary Examiner* — Zachary K Huson
(74) *Attorney, Agent, or Firm* — Fleycher Yoder, P.C.

(57) ABSTRACT

Devices and methods of providing drivers for software and hardware systems to avoid additional polling or interrupt mechanisms are provided. An electronic device includes a processor supporting a device driver to perform a data packet receiving operation or data packet transmission operation. The device driver causes the processor to receive one or more data packets to a port of the processor according to a time-synchronization protocol. The device driver polls the DMA feature for a completion status of the storing. The device driver causes the processor to determine a timestamp of the one or more data packets and to complete the data packet receiving operation without the device driver causing the processor to perform a polling operation or an interrupt operation to retrieve the timestamp of the one or more data packets.

20 Claims, 4 Drawing Sheets

DRIVER FOR NETWORK TIMING SYSTEM

BACKGROUND

This disclosure relates generally to drivers in software and hardware systems and, more particularly, to more efficient drivers for software and hardware network timing systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network protocols such as the Institute of Electrical and Electronics Engineers (IEEE) 1588 Precision Timing Protocol (PTP) and Network Timing Protocol (NTP) are used to synchronize different computing devices or different components of computing devices. These protocols may involve using a hardware or software driver to read timestamps after data packets arrive to a particular hardware component of a computing device or other device or after data packets depart from the particular hardware component or other device. In some instances, the arrival or departure of the data packets may be identified by the driver by an interrupt mechanism or by way of repeatedly polling a status bit as part of a direct memory access (DMA) mechanism. Further, since the associated timestamp may be useful for certain application programs running on the computing device, the driver may once again use a polling mechanism or an interrupt mechanism to fetch the timestamp from the hardware. Because the driver may depend solely upon polling mechanisms and interrupt mechanisms to fetch timestamp data, the driver may often incur delay in reading the time, and particularly more variable delay in reading the timestamp. It may be useful to provide techniques to improve delay and deterministic latency in network timing systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to drivers for software and hardware systems to avoid additional polling or interrupt mechanisms are provided. An electronic device includes a processor supporting a device driver to perform a data packet receiving operation or data packet transmission operation. The device driver causes the processor to receive one or more data packets according to a time-synchronization protocol, and causes the processor to initiate a direct memory access (DMA) feature to store data of the one or more data packets into one or more socket buffers supported by the processor. The device driver causes the processor to initiate an input/output (I/O) read operation, and causes the processor to determine a timestamp of the one or more data packets and to complete the I/O read operation without the device driver causing the processor to perform a polling operation or an interrupt operation.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
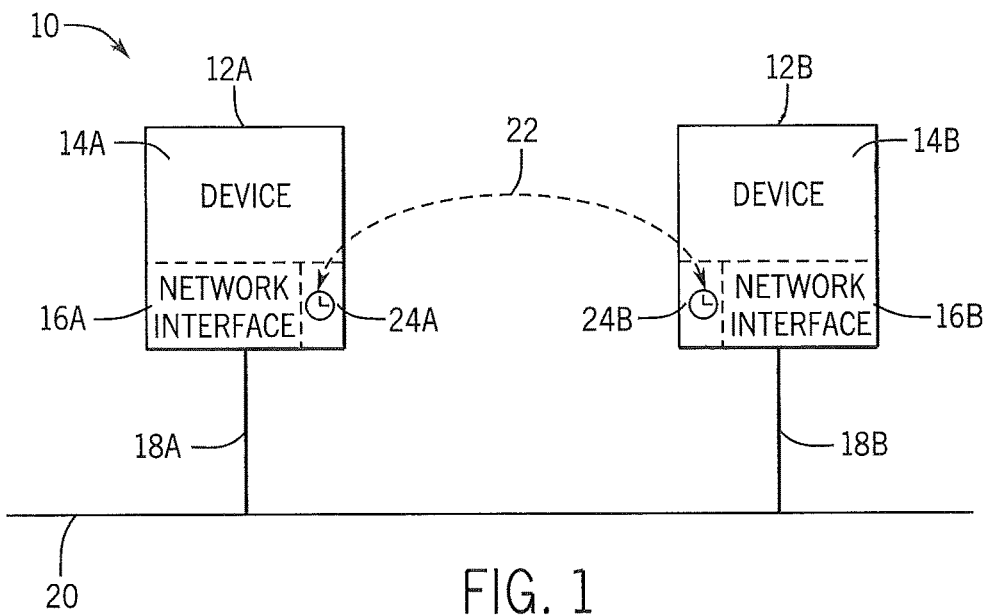
FIG. 1 is a diagram for the communication of two electronic devices connected via a network, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Present embodiments relate to drivers for software and hardware systems and techniques to avoid additional polling or interrupt mechanisms for fetching additional information (e.g., timestamp or other metadata) associated with the reception and/or transmission of a data packet from the hardware to decrease delay and delay variation. For example, a software driver may interact between the hardware and a particular application utilizing, for example, the libraries provided by the operating system of a computing device or other electronic system(s). Generally, a driver may utilize techniques such as, for example, polling mechanisms or interrupt mechanisms to interact with the hardware. However, as previously noted, polling mechanisms and interrupt mechanisms may each include variable latency, and may further contribute to unnecessary delays in the data (e.g., packets) receiving operations and the data transmitting operations of the computing device or other electronic system(s).

Accordingly, in certain embodiments, it may be useful to provide techniques to avoid superfluous polling mechanisms and/or interrupt mechanisms for fetching the additional information (e.g., timestamps or other metadata) associated with the data (e.g., packet) from the hardware, and any further delay and delay variation from the hardware in reading the additional information. For example, in some embodiments, when receiving, a hardware read-ahead technique may be provided in which non-overflowing design components such as a first-in-first-out (FIFO) mechanism and driver may read the data (e.g., packets) from the hardware after some delay, and further take the latency of the hardware blocks into consideration, or another event not requiring a polling mechanism or an interrupt mechanism. In this way, the driver may read the required information (e.g., timestamps or other metadata) faster and with improved deterministic latency.

Similarly, in certain embodiments, when transmitting, the FIFO mechanism and driver may write the data to the hardware after some delay, taking the latency of the hardware blocks into consideration, or another event not requiring a polling mechanism or an interrupt mechanism. Thus, the driver may again read the required information (e.g., timestamps or other metadata) faster and with improved deterministic latency. Indeed, the present embodiments may provide drivers that facilitate the passing of information between the application and the hardware more efficiently and with less variable delays (e.g., increased deterministic latency). This may further lead to an increase in efficiency of the computing device and components, as the central processing unit (CPU) of the computing device may experience an increase in its available processing power due to the present techniques of removing polling mechanisms or interrupt mechanisms to acquire data (e.g., packets) timestamps or other metadata. In this way, an application running on the computing device or the underlying hardware may make use of the information (e.g., timestamps) significantly sooner, as may be useful for applications such as, for example, IEEE 1588 PTP and NTP.

With the foregoing in mind, it may be useful to describe a network system that includes drivers used to avoid additional polling or interrupt mechanisms for fetching additional information (e.g., timestamp or other metadata) associated with the reception and/or transmission of a data packet, such as a network system 10 illustrated in FIG. 1. As depicted in FIG. 1, the network system 10 may include a number of electronic devices 12A and 12B that may establish communication using a network channel 20. Examples of the type of electronic devices found in some implementations include but are not limited to a general purpose computer, a System-on-Chip (SoC), a network router, switch or relay, a hardware controller, a sensor, and so forth. The electronic device 12A may include data utilization circuitry 14A responsible for the performance of some of the device functions. When one of the functions involve communication between the electronic device 12A and device 12B (or any other device in the network system 10) the data utilization circuitry 14A uses a network interface 16A, a specialized electronic circuitry that allows the electronic device 12A to access the network channel 20. The network interface 16A may be responsible for generating, receiving and rerouting data packets compliant with the certain network protocols (e.g., IEEE 1588 PTP and NTP protocols).

Furthermore, the electronic device 12A may also include a clock 24A providing Time-of-Day (ToD) information, which may be used by the data utilization circuitry 14A in the performance of its functions. The electronic device 12B may include network interface 16B, a clock 24B and data utilization circuitry 14B. Note that the data utilization circuitry 14A and 14B may be distinct from each other. As an example, electronic device 12A may be a telemetry monitor and electronic device 12B may be a sensor. In this example, the data utilization circuitry 14A may be a general purpose computer and the data utilization circuitry 14B may be circuitry containing sensor and data acquisition electronics. The data utilization circuitry 14A and/or 14B may include circuitry corresponding to a Programmable Logic Device (PLD) or a Field Programmable Gate Array (FPGA), a computer, or application-specific hardware, such as an application-specific integrated circuit (ASIC).

In some applications, a synchronization 22 between clocks 24A and 24B may be desired for proper function of electronic devices 12A and 12B. Since the communication delays in a data packet passing from network interface 16A and 16B may be random, techniques to measure that delay may be employed in the calculation of the offset between the ToD values in clocks 24A and 24B.

Figure 2:
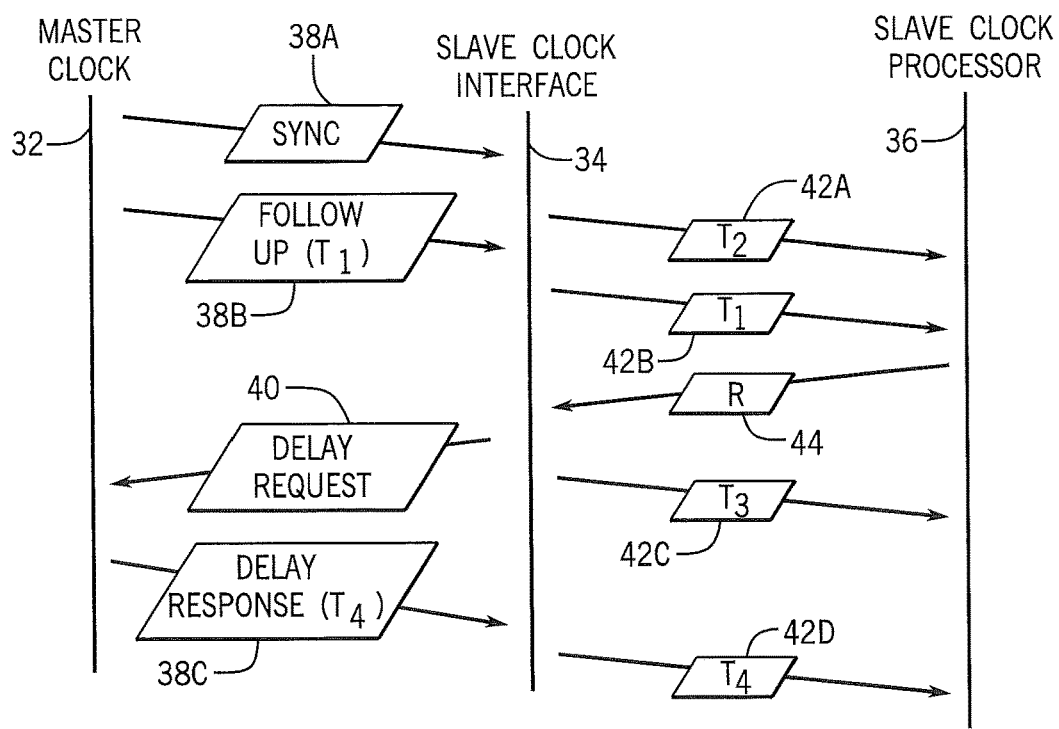
FIG. 2 is a time sequence diagram for synchronization as specified in IEEE 1588 between a master and a slave clock, in accordance with an embodiment.

In certain embodiments, a precision time protocol (PTP) and/or network timing protocol (NTP) defined in the IEEE 1588 protocol specifies a method for such synchronization between electronic device(s) 12A, 12B in the network system 10. Although this application describes time-synchronization according to the IEEE 1588 protocol by way of example, it should be appreciated that the modular architecture of this disclosure may employ any suitable time-synchronization protocol, and should not be understood to be limited to the IEEE 1588 protocol. A sequence diagram 30 implementing aspects of the IEEE 1588 protocol is illustrated in FIG. 2. In accordance with the protocol, a master clock 32 communicates with a slave clock by sending a "sync" message 38A to the slave clock interface 34. The slave clock interface 34 sends to the slave clock processor 36 the timestamp $t_2$ 42 corresponding to the Slave Clock ToD when the "sync" message 38A was received. The master clock 32 also sends a "follow up" message 38B carrying a timestamp $t_1$ of the Master Clock ToD when the "sync" message 38A was sent. The content of the "follow up" message 38B, timestamp $t_1$ 42B, is forwarded by the slave clock interface 34 to the slave clock processor 36.

At any time, the slave clock processor 36 may send a request 44 to the slave clock interface 34 for a delay. The slave clock interface 34 sends a delay request 40 to the master clock 32 and may send the corresponding timestamp $t_3$ 42C to the slave clock processor 36. Finally, the master clock 32 sends a "delay response" message 38C to the slave clock interface 34, which forwards the content, timestamp $t_4$ 42D, to the slave clock processor 36. The four timestamps 42A-D, allow the slave clock processor 36 to calculate the offset between the master and the slave clocks and synchronize the clock accordingly, through the formula $o=(t_2-t_1+t_3-t_4)/2$.

The synchronization methods described above employ exchange of packets that are timestamped at the moment of transmission or reception by a network device, as specified by the IEEE 1588 protocol. For improved accuracy, the generation of timestamps and parsing of data packets to identify IEEE 1588 commands may be implemented within the logic of the network circuitry. Note that the logic of the network interface also implements instructions responsible for reception, transmission, and redirection of certain network protocol data packets, in accordance with the IEEE 1588 protocol.

Figure 3:
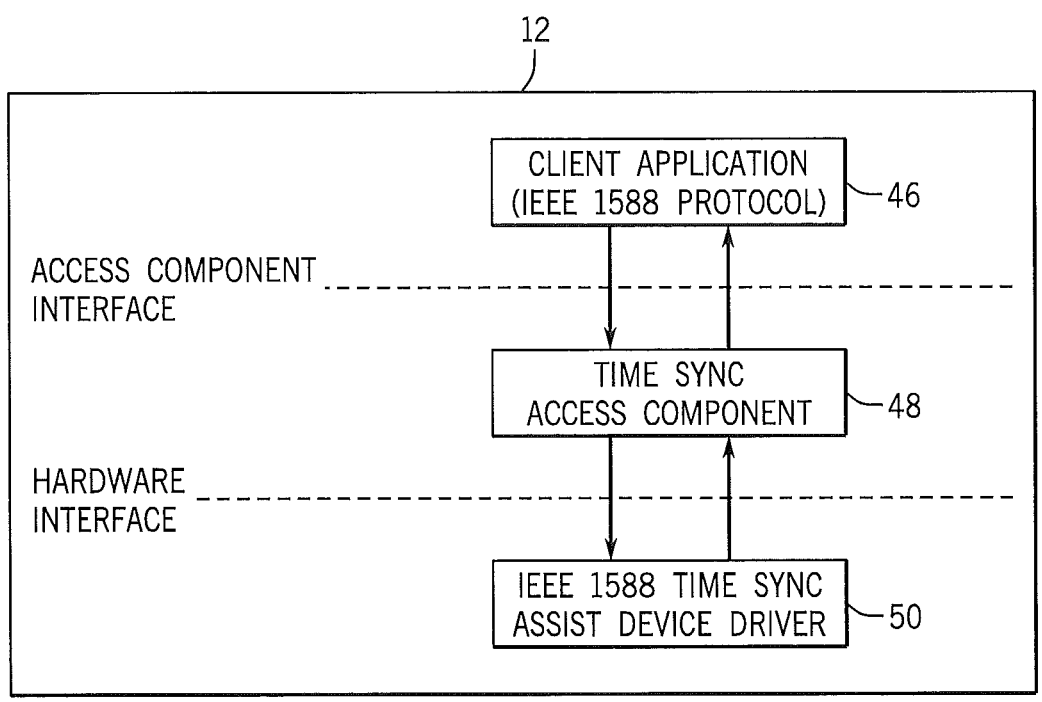
FIG. 3 is a diagram of the architecture of an electronic device containing a 3-tier IEEE 1588-compliant MAC interface, in accordance with an embodiment.

In certain embodiments, as illustrated in FIG. 3, the electronic device(s) 12A, 12B may include a client application 46, a time sync assess component 48, and a device driver 50 (e.g., time sync IEEE 1588 assist device driver). For example, as noted above, the IEEE 1588 protocol may define a precision clock synchronization protocol for networked measurements and control systems. For example, the IEEE 1588 protocol may define several messages that may be used to exchange timing information. In certain embodiments, the device driver 50 may be used to configure and command the time sync access component 48 through, for example, a set of application programming interfaces (APIs). For example, the device driver 50 may be utilized in the client application 46.

Indeed, in certain embodiments, the device driver 50 (e.g., IEEE 1588 Hardware Assist device driver) may allow through the use of the client application 46, configuration and retrieval of system time and timestamps of the specific IEEE 1588 PTP and NTP messages from one or more hardware assist blocks that may be included as part of the hardware interface of the electronic device(s) 12A, 12B. Further, in some embodiments, the client application 46 and the device driver 50 may utilize interrupt mechanisms or event based mechanisms to retrieve the timestamps of target time, auxiliary, and IEEE 1588 PTP and/or NTP messages and additional information as per the protocol.

For example, as previously noted, in some embodiments, the device driver 50 may utilize techniques such as, for example, polling mechanisms or interrupt mechanisms to interact with the hardware of the electronic devices 12A, 12B. However, polling mechanisms and interrupt mechanisms may each include variable latency, and may further contribute to unnecessary delays in the data (e.g., packets) receiving operations and the data transmitting operations of the electronic devices 12A, 12B other devices and systems that may be included in the network system 10. Accordingly, as will be discussed with respect to FIGS. 4 and 5, it may be useful to provide a device driver 50 useful in avoiding additional polling or interrupt mechanisms for fetching additional information (e.g., timestamp or other metadata) associated with the reception and/or transmission of a data packet from the hardware to decrease delay and delay variation and to improve deterministic latency.

Figure 4:
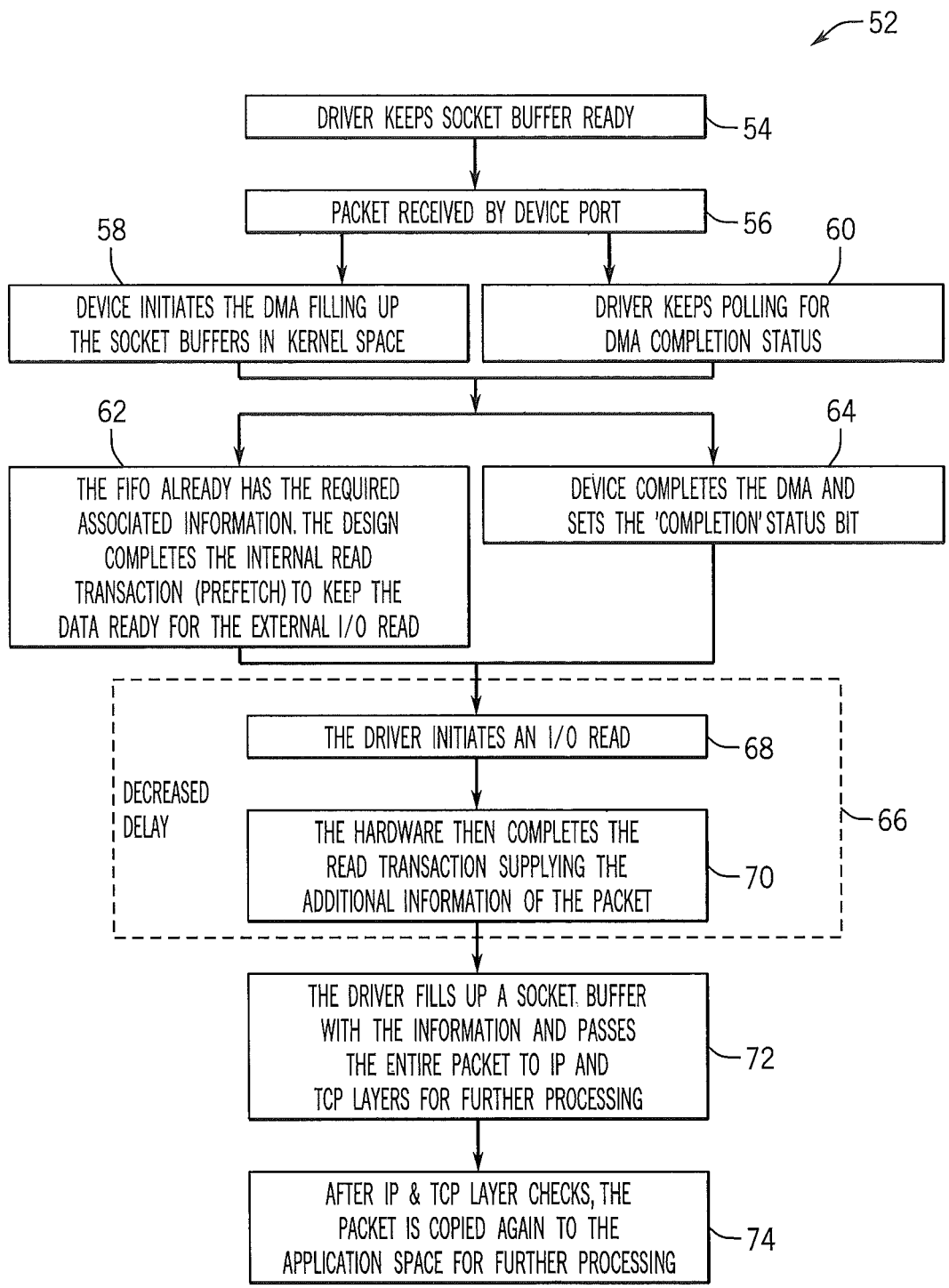
FIG. 4 is a flow chart of a receiving (RX) data flow process for improving delay and deterministic latency in network systems, in accordance with an embodiment.

Turning now to FIG. 4, a flow diagram is presented, illustrating an embodiment of a process 52 useful in improving delay and deterministic latency in network systems utilizing the device driver 50 and one or more processors included as part of the electronic device(s) 12A, 12B and depicted in FIGS. 1 and 3. The process 52 may include code or instructions stored in a non-transitory machine-readable medium (e.g., a memory system of the electronic device(s) 12A, 12B) and executed, for example, by the device driver 50 and one or more processors of the electronic device(s) 12A, 12B. The process 52 may include the device driver 50 preparing (block 54) socket buffers (e.g., skbs) for storage. The process 52 may continue with a data packet being received (block 56) at a port of the electronic device(s) 12A, 12B. The process 52 may continue with the electronic device(s) 12A, 12B initiating (block 58) a direct memory access (DMA) for storing data of the data packet into one or more socket buffers (e.g., skbs) in kernel space. The process 52 may also continue with the device driver 50 of the electronic device(s) 12A, 12B polling (block 60) the DMA for completion status with respect to the storing of the data packet in the one or more socket buffers (e.g., skbs).

In certain embodiments, as further illustrated by the process 52 (and as highlighted by the dashed line 66), the process 52 may include the device driver 50 utilizing a FIFO component (e.g., FIFO buffer) to extract and/or store (block 62) ancillary or additional information (e.g., timestamps, metadata) associated with the data packet. For example, in some embodiments, when receiving, the FIFO component may pre-fetch the ancillary or additional information (e.g., timestamps, metadata) from the hardware of the electronic device(s) 12A, 12B after some delay, and further take the latency of the hardware blocks (e.g., hardware interface) into consideration, such that the device driver 50 need not perform a polling mechanism or an interrupt mechanism to, for example, retrieve the ancillary or additional information (e.g., timestamps, metadata) after the data packet is received and read. The process 52 may then continue with the electronic device(s) 12A, 12B completing (block 64) the DMA and setting a "completion status" indication bit (e.g., setting the "completion status" indication bit to a value "1").

The process 52 may then continue with the device driver 50 initiating (block 68) an input/output (I/O) read operation (e.g., external I/O read operation). The process 52 may then continue with the electronic device(s) 12A, 12B (e.g., hardware) (block 70) completing the I/O read operation (e.g., external I/O read operation) and supplying the ancillary or additional information (e.g., timestamps, metadata) of the data packet. The process 52 may then continue with the device driver 50 (block 72) storing the ancillary or additional information (e.g., timestamps, metadata) of the data packet into one or more socket buffers (e.g., skbs) and passing the data packet to the internet protocol (IP) and transmission control protocol (TCP) layers for further processing. The process 52 may then conclude with the electronic device 12A, 12B copying (block 74) the data packet to the application space (e.g., client application 46) for further processing.

Figure 5:
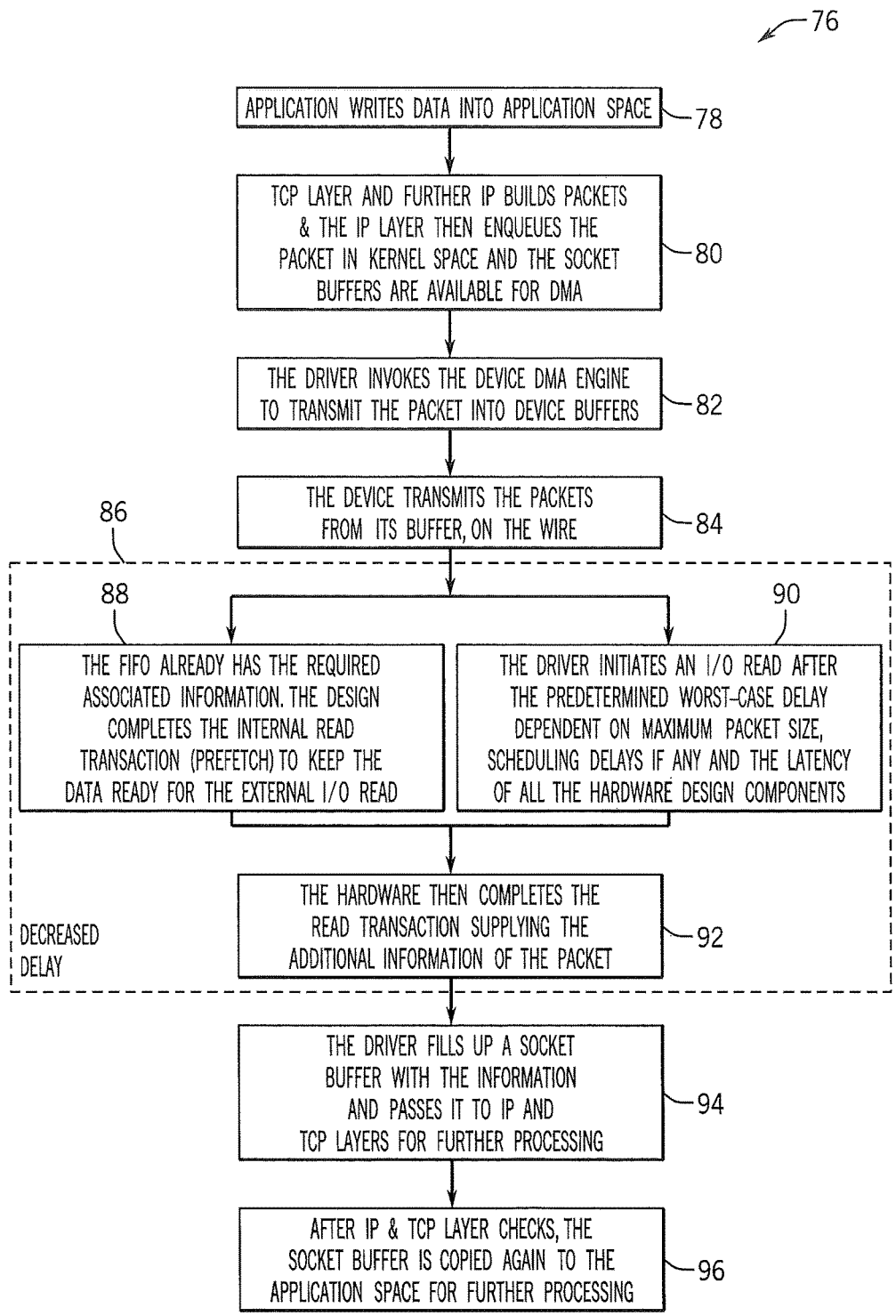
FIG. 5 is a flow chart of a transmitting (TX) data flow process for improving delay and deterministic latency in network systems, in accordance with an embodiment.

Turning now to FIG. 5, a flow diagram is presented, illustrating an embodiment of a process 76 useful in improving delay and deterministic latency in network systems utilizing the device driver 50 and one or more processors included as part of the electronic device(s) 12A, 12B and depicted in FIGS. 1 and 3. The process 76 may include code or instructions stored in a non-transitory machine-readable medium (e.g., a memory system of the electronic device(s) 12A, 12B) and executed, for example, by the device driver 50 and one or more processors of the electronic device(s) 12A, 12B. The process 76 may include the client application 46 of the electronic device(s) 12A, 12B writing (block 78) data into the application space (e.g., client application 46). The process 76 may continue with the TCP/IP layers constructing (block 80) the data packets and enqueing the data packet into kernel space, and preparing the socket buffers (e.g., skbs) for DMA availability. The process 76 may continue with the device driver 50 of the electronic device(s) 12A, 12B invoking (block 82) the electronic device(s) 12A, 12B DMA engine to transmit the data packet into buffers of the electronic device(s) 12A, 12B. The process 76 may continue with the device driver 50 of the electronic device(s) 12A, 12B transmitting (block 84) the data packet from the buffers via one or more conductors (e.g., wires).

In certain embodiments, as further illustrated by the process 76 (and as highlighted by the dashed line 86), the process 76 may include the device driver 50 utilizing a FIFO component (e.g., FIFO buffer) to extract and/or store (block 88) ancillary or additional information (e.g., timestamps, metadata) associated with the data packet. For example, in some embodiments, when transmitting, the FIFO component may pre-fetch the ancillary or additional information (e.g., timestamps, metadata) from the hardware of the electronic device(s) 12A, 12B after some delay, and further take the latency of the hardware blocks (e.g., hardware interface)

into consideration, such that the device driver need not perform a polling mechanism or an interrupt mechanism to, for example, retrieve the ancillary or additional information (e.g., timestamps, metadata) after the data packet is transmitted. The process 76 may also include the device driver 50 initiating (block 90) an I/O read operation (e.g., external I/O read operation) after a predetermined (e.g., calculable or configurable) worst-case delay based on, for example, the maximum data packet size, any scheduling delays, and the overall latency of each of the design hardware components of the electronic device(s) 12A, 12B.

The process 76 may then continue with the electronic device(s) 12A, 12B (e.g., hardware) (block 92) completing the I/O read operation (e.g., external I/O read operation) and supplying the ancillary or additional information (e.g., timestamps, metadata) of the data packet. The process 76 may then continue with the device driver 50 (block 94) storing the ancillary or additional information (e.g., timestamps, metadata) of the data packet into one or more socket buffers (e.g., skbs) and passing the data packet to the IP) and TCP layers for further processing. The process 76 may then conclude with the electronic device 12A, 12B copying (block 96) the data packet to the application space (e.g., client application 46) for further processing.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An electronic device, comprising:
   a processor supporting a device driver to perform a data packet receiving operation, wherein the device driver:
   causes the processor to receive one or more data packets to a port of the processor according to a time-synchronization protocol;
   causes the processor to initiate a direct memory access (DMA) feature to store data of the one or more data packets into one or more socket buffers supported by the processor, wherein the device driver polls the DMA feature for a completion status of the storing;
   causes the processor to set a completion status bit when the DMA feature indicates the completion status of the storing;
   causes the processor to initiate an input/output (I/O) read operation; and
   causes the processor to determine a timestamp of the one or more data packets and to complete the data packet receiving operation without the device driver causing the processor to perform a polling operation or an interrupt operation to retrieve the timestamp of the one or more data packets.

2. The electronic device of claim 1, wherein the device driver causes the processor to determine the timestamp without causing the processor to perform the polling operation or the interrupt operation by utilizing a first-in-first-out (FIFO) component to read the timestamp of the one or more data packets.

3. The electronic device of claim 1, wherein the device driver causes the processor to determine the timestamp without causing the processor to perform the polling operation or the interrupt operation by causing the processor to perform a read-ahead pre-fetch of the timestamp of the one or more data packets.

4. The electronic device of claim 1, wherein the device driver causes the processor to determine the timestamp and additional information of the one or more data packets without causing the processor to perform the polling operation or the interrupt operation.

5. The electronic device of claim 1, wherein the time-synchronization protocol comprises the Institute of Electrical and Electronics Engineers (IEEE) 1588 Precision Timing Protocol (PTP).

6. The electronic device of claim 1, wherein the time-synchronization protocol comprises the Network Timing Protocol (NTP).

7. The electronic device of claim 1, wherein the device driver causes the processor to determine the timestamp without causing the processor to perform the polling operation or the interrupt operation to decrease a delay with respect to the performance of the data packet receiving operation.

8. The electronic device of claim 1, wherein the device driver causes the processor to determine the timestamp without causing the processor to perform the polling operation or the interrupt operation to increase a deterministic latency with respect to the performance of the data packet receiving operation.

9. An electronic device, comprising:
   a processor supporting a device driver to perform a data packet transmission operation according to a time-synchronization protocol, wherein the device driver:
   causes the processor to construct one or more data packets;
   causes the processor to initiate a direct memory access (DMA) feature to store the one or more data packets into one or more buffers supported by the processor;
   causes the processor to transmit the one or more data packets from the one or more buffers via a conductor;
   causes the processor to initiate an input/output (I/O) read operation after a determined delay following the transmission of the one or more data packets via the conductor; and
   causes the processor to determine a timestamp of the one or more data packets and to complete the data packet transmission operation without the device driver causing the processor to perform a polling operation or an interrupt operation to retrieve the timestamp of the one or more data packets.

10. The electronic device of claim 9, wherein the device driver utilizes a first-in-first-out (FIFO) component to read the timestamp of the one or more data packets without causing the processor to perform the polling operation or the interrupt operation.

11. The electronic device of claim 9, wherein the device driver causes the processor to determine the timestamp without causing the processor to perform the polling operation or the interrupt operation by causing the processor to perform a read-ahead pre-fetch of the timestamp of the one or more data packets.

12. The electronic device of claim 9, wherein the device driver causes the processor to initiate the I/O read operation after a predetermined worst-case delay as the determined delay.

13. The electronic device of claim 9, wherein the time-synchronization protocol comprises the Institute of Electrical and Electronics Engineers (IEEE) 1588 Precision Timing Protocol (PTP).

14. The electronic device of claim 9, wherein the time-synchronization protocol comprises the Network Timing Protocol (NTP).

15. The electronic device of claim 9, wherein the device driver causes the processor to determine the timestamp without causing the processor to perform the polling operation or the interrupt operation to decrease a delay with respect to the performance of the data packet transmission operation.

16. The electronic device of claim 9, wherein the device driver causes the processor to determine the timestamp without causing the processor to perform the polling operation or the interrupt operation to increase a deterministic latency with respect to the performance of the data packet transmission operation.

17. A non-transitory computer-readable medium having computer executable code stored thereon, the code comprising instructions to:
cause a device driver that performs functions associated with an application running on an electronic device to determine a timestamp of a data packet to be received or transmitted at the electronic device at least in part by causing the device driver to perform a read-ahead pre-fetch of the timestamp of the data packet, wherein the device driver comprises a first-in-first-out (FIFO) component that stores the timestamp of the data packet, such that the device driver initiates and completes a data packet receiving operation or transmission operation without the device driver performing a polling operation or an interrupt operation to retrieve the timestamp of the data packet, and such that a delay with respect to the application or the electronic device is decreased.

18. The non-transitory computer-readable medium of claim 17, wherein the code comprises instructions to cause the device driver to determine each timestamp of a plurality of data packets to be received or transmitted at the electronic device without performing the polling operation or the interrupt operation.

19. The non-transitory computer-readable medium of claim 17, wherein the code comprises instructions to cause the device driver to perform functions associated with the Institute of Electrical and Electronics Engineers (IEEE) 1588 Precision Timing Protocol (PTP) as the application running on the electronic device.

20. The non-transitory computer-readable medium of claim 17, wherein the code comprises instructions to cause the device driver to perform functions associated with the Network Timing Protocol (NTP) as the application running on the electronic device.

* * * * *